United States Patent [19]

Osborne

[11] 4,059,883

[45] Nov. 29, 1977

[54] APPARATUS FOR REMOVING AN IGNITION KEY CYLINDER

[75] Inventor: Ray L. Osborne, Cuyahoga Falls, Ohio

[73] Assignee: Milton English, Akron, Ohio

[21] Appl. No.: 661,402

[22] Filed: Feb. 25, 1976

[51] Int. Cl.² .......... B23P 19/04

[52] U.S. Cl. .......... 29/259; 29/263; 279/42; 279/48; 279/51

[58] Field of Search .......... 279/51, 48, 46, 50, 279/52, 56, 57, 41, 42; 29/258, 259, 260, 263

[56] References Cited

U.S. PATENT DOCUMENTS

| | | | |
|---|---|---|---|
| 268,340 | 11/1882 | Woerd | 279/51 X |
| 422,013 | 2/1890 | Ekstrom | 29/259 X |
| 668,395 | 2/1901 | Strickler | 279/48 X |
| 2,050,005 | 8/1936 | Heegeman | 29/263 |
| 2,438,797 | 3/1948 | Bagge | 279/51 |
| 3,210,836 | 10/1965 | Johanson et al. | 279/51 X |
| 3,579,796 | 5/1971 | Fillion | 29/263 |
| 3,972,103 | 8/1976 | Kenyon | 29/263 |

*Primary Examiner*—Richard B. Lazarus
*Assistant Examiner*—W. R. Briggs
*Attorney, Agent, or Firm*—Oldham & Oldham Co.

[57] ABSTRACT

An apparatus for removing an ignition key or lock cylinder containing a shaft. A collet assembly which can grasp an ignition key cylinder or lock cylinder is also mounted on the shaft. An annulus is mounted on the collet assembly for maintaining a secure engagement on the ignition key cylinder and a casing is mounted over the collet assembly shaft and annulus.

4 Claims, 5 Drawing Figures

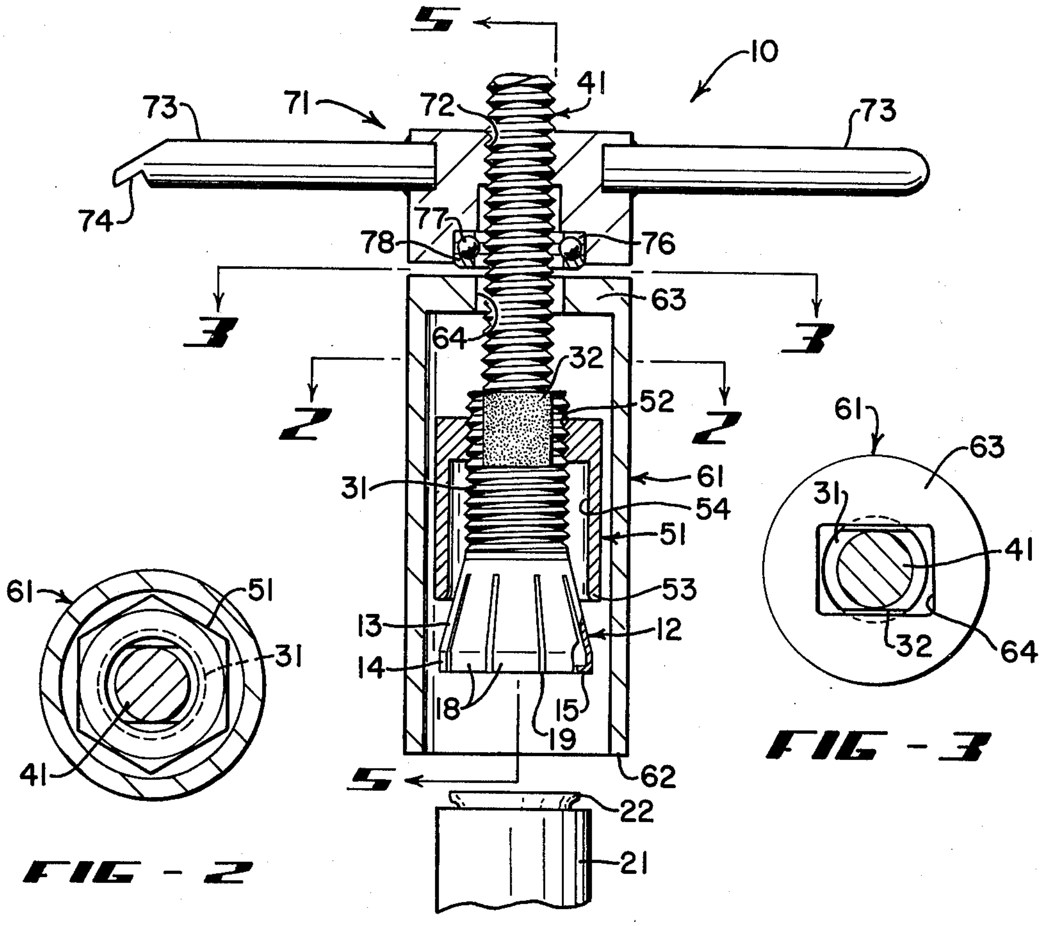
FIG - 1
FIG - 2
FIG - 3
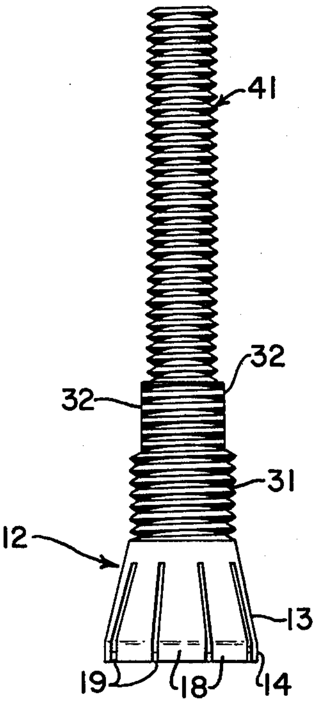
FIG - 4
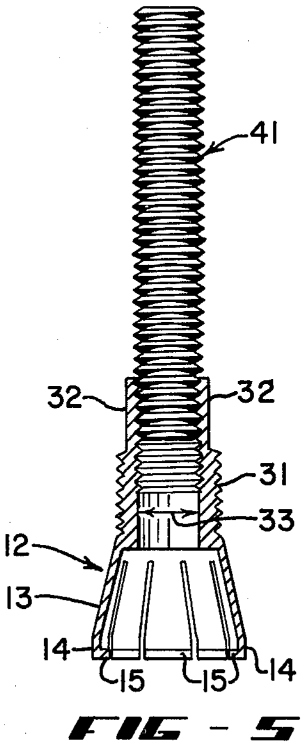
FIG - 5

APPARATUS FOR REMOVING AN IGNITION KEY CYLINDER

BACKGROUND OF THE INVENTION

The present invention relates to an apparatus for removing a lock cylinder from its housing such as from a vehicle. More specifically, the present invention relates to an ignition key removal apparatus which upon the application of a force readily and easily pulls the ignition key out of engagement with the vehicle.

Heretofore, whenever a dash mounted ignition key needed relacement in a vehicle, due to failure, jamming, etc., the ignition key was usually quickly removed through the utilizing of special tools or removal of nuts or other fasteners. Recently, however, ignition keys have been mounted on a steering column of a vehicle to prevent theft thereof. Standard removal procedure, unlike the dash mounted ignition keys, requires the disassembly of the steering wheel column and replacement of ignition key cylinder. Due to the matter of installation of the ignition key cylinder, this method is largely unavoidable. Thus, replacement of a relatively inexpensive key requires an inordinate amount of time and effort and accordingly, a large monetary outlay.

SUMMARY OF THE INVENTION

It is therefore an object of the present invention to provide a removal apparatus for a lock cylinder, which is convenient and easily utilized.

It is another object of the present invention to provide a removal apparatus for a lock cylinder, which does not require the disassembly of a vehicle steering column.

It is yet another object of the present invention to provide a removal apparatus for a lock cylinder, wherein a secure grip is maintained on the lock cylinder during removal.

It is yet another object of the present invention to provide a removal apparatus for a lock cylinder, wherein the removal apparatus contains a shaft, a collet assembly and a casing.

It is yet another object of the present invention to provide the removal apparatus for a lock cylinder, as above, wherein an annulus or other fastening device engages the collet assembly to assure a secure fit.

It is yet another object of the present invention to provide a removal apparatus for a lock cylinder, as above, wherein a force is applied to a wrench or lever to remove the lock cylinder, said lever being mounted on said shaft.

It is yet another object of the present invention to provide a removal apparatus for a lock cylinder, as above, wherein the collet assembly has a conical portion and said collet contains resilient fingers thereon which engage the lock cylinder.

It is yet another object of the present invention to provide a removal apparatus for a lock cylinder, as above, wherein the annulus contains a recess and threadibly engages a portion of the collet assembly so that engagement of the annulus with the conical collet forces the fingers into a tighter securing engagement with the lock cylinder.

It is yet another object of the present invention to provide a removal apparatus for a lock cylinder, as above, wherein a casing resides about the shaft, the collet assembly and the annulus and engages the housing holding said cylinder lock assembly so that upon the application of a force to the lever, the casing bears against the housing with the shaft and collet assembly being withdrawn therefrom.

These and other objects of the present invention will become apparent from the following specification which describes in detail various embodiments without attempting to discuss all of the modifications in which the invention might be embodied.

In general, an apparatus for removing an ignition key assembly comprises, a collet assembly, a shaft, said shaft assembly encasing said collet assembly, an annulus, said annulus engaging on said collet assembly, and a casing, said casing extending at least partially about said collet assembly.

DESCRIPTION OF THE DRAWINGS

FIG. 1 is a partial cross-sectional view showing the removal apparatus of the present invention;

FIG. 2 is a cross-sectional view taken on lines 2—2 of FIG. 1;

FIG. 3 is a cross-sectional view taken on line 3—3 of FIG. 1

FIG. 4 is a side view showing the shaft attached to the collet assembly;

FIG. 5 is a cross-sectional view taken on line 5—5 of FIG. 1 showing the shaft attached to the collet assembly.

DESCRIPTION OF THE PREFERRED EMBODIMENTS

According to the concepts of the present invention, an apparatus for removing a lock cylinder or an ignition key cylinder from its housing such as a vehicle is generally shown in FIG. 1. The removal apparatus is generally indicated by the numeral 10 and preferably is made of metal. Removal apparatus 10 can be quickly secured to the lock cylinder of any conventional lock maintained in place by a spring or other restraining, retaining or securing device which can be overcome by a small force. The removal apparatus desirably is attached to an ignition key cylinder and, through the application of a force to a lever, can quickly and surely remove the lock cylinder.

As best seen in FIGS. 1, 4 and 5, a collet assembly is generally indicated by the numeral 12. The collet assembly contains a collet portion 13 which desirably is inclined such that it has a conical shape. End portion 14 of collet portion 13 extends outwardly for a short portion at no incline, that is parallel to collet base portion 31 hereinafter described. End 14 of collet portion 13 has an inwardly extending flange 15 and thus forms a lip. Preferably, the inner portion of the flange is squared off or has square corners so that a good or secure grip can be maintained on an end flange portion of a convention lock cylinder 21.

Collet portion 13 contains fingers 18 which are formed by slots 19 cut into the collet portion. The provision of slots provides a springing action to the collet portion so that upon insertion as over an ignition key cylinder, the fingers can spring apart or bend outwardly, that is, in a radial direction, and slide over a flange portion commonly found on the end of the lock cylinder. Of course, as lip flange 15 is moved entirely across the lock cylinder flange 22, lip flange 15 will spring back towards its original shape or position. Desirably, the opening or diameter of the lip flange is slightly smaller than that of the external diameter of the lock cylinder flange with the radial extent or distance of lip flange 15 being sufficient to reside under at least a portion of the lock cylinder flange 22 to provide a bearing surface.

Collet assembly 12 also has a base portion 31 which may be in the shape of a tube or cylinder. The entire collet assembly may be integral as shown in the drawings or may be joined together as through welding or the like. Collet base portion 31 has external and internal threads along at least a portion thereof and extending towards collet 13. As shown in FIGS. 1, 4 and 5, the base portion of the collet may contain two flat portions 32 which are parallel but located on the opposite sides of the base portion. Additionally, the base portion contains an aperture 33 as shown in FIG. 5.

The shaft, generally indicated by the numeral 41, desirably contains threads thereon or some other fastener device. Thus, in the embodiment shown, shaft 41 is connected to collet base portion 31 through a mating engagement of the shaft threads with the internal threads of the base portion. Of course, the shaft may be connected to the base portion in any other conventional manner such as through welding. In order to prevent shaft 41 from rotating freely within base portion aperture 33, either aperture 33 or an end portion of the shaft 41 may be tapered so that upon threading of the shaft a sufficient distance into base portion 31, a snug engagement is obtained.

An important facet of the present invention relates to an annulus, generally indicated by the numeral 51. The annulus is generally in the shape of a cylinder having a conventional fastening means for engaging either shaft 41 or collet base portion 31. In the embodiments shown, annulus 51 has a reduced neck portion 52 which through threads matingly engages the threads of the collet base portion 31. Of course, although the utilization of threads constitutes the preferred embodiment, any number of conventional fastening engagements may be utilized. Similarly, shaft 41 need not be a separate part as in the preferred embodiment, but may be integral with the collet assembly portion and thus have the same diameter as the collet base portion.

Annulus 51 has a shoulder 53 located opposite neck portion 52. The internal diameter 54 of the annulus is less than that of the largest external diameter of the conical collet 13. Thus, upon rotation of annulus 51, shoulder 53 will engage the outwardly inclined fingers 18 of collet 13 and thereby springingly compress the fingers radially inward. Thus, when collet lips 15 have been applied above the ignition key cylinder flange 22, rotation of annulus 51 will insure a positive and mechanical engagement as well as a secure fit of the collet assembly about the flange of the ignition key cylinder or lock cylinder. To facilitate rotation of annulus 51, the external or outside surface may be hexhagonal or otherwise to allow the wrench to engage the annulus and apply a substantial amount of force to fingers 18 of the collet portion 13. Hence, annulus 51 insures that a secure and tight mechanical engagement of collet assembly 12 with the cylinder lock is maintained.

A casing, generally indicated by the numeral 61 encases collet assembly 12, annulus 51 and a portion of shaft 41. The main purpose of casing 61 is to provide a rest means as through casing shoulder 62 which abutts a lock cylinder housing or other bearing surface. In the preferred embodiment of the invention, the housing, of course, would be mounted on a steering wheel column of a vehicle.

As shown in FIG. 1, casing 61 may simply be a cylinder having a base portion 63. The cylinder, of course, has a sufficient internal diameter so that it is larger or fits over the various above-identified components. As best shown in FIG. 3, base portion 62 has an aperture 64 which is of the sufficient size and shape to fit about shaft 41 and permit the shaft to extend therethrough. An optional feature of aperture 64 is that it may be shaped in a configuration such that it matingly engages flat portions 32 of collet assembly 12. This provision permits annulus 51 to be hand tightened about collet portion 13 simply by holding the annulus in one hand, inserting the base portion of casing 61 over flat portions 32 and rotating the casing with the other hand.

A lever or "T" wrench, generally indicated by the numeral 71, or other tightening device is applied to the free end of shaft 41 and tightened so as to bear against base portion 63 of the casing and to withdraw or pull shaft 41 towards the casing base. As shown in FIG. 1, lever or wrench 71 may simply be a piece of metal of any shape having an aperture 72 therethrough. Extending outward from the material and secured thereto are arms 73. One of the arms may have a recess 74 which is utilized to pry off the cover of the lock cylinder, if any, or of the ignition key cylinder thereby exposing lock or ignition key flange 22. In order to reduce the friction encountered between lever 71 and casing 61, a sliding or low friction ring 76 is provided within the lever. Any conventional assembly may be utilized such as ball bearing 77 and end washer 78. This arrangement permits the washer to bear against casing base 63 without any washer rotation and yet lever 71 is allowed to freely rotate.

In the utilization of the lock cylinder or ignition key cylinder, the cover (not shown) of the lock cylinder or ignition key cylinder is removed. Then collet portion 13 is snapped over lock cylinder flange 22 and annulus 51 rotated or screwed upon collet end portion 14 until shoulders 53 contact the conical or finger portions 18 of collet 13. Then, the annulus is tightened to effect a secure and mechanical engagement since finger lips 15 are positioned under or behind cylinder lock flange 22 and secured in tight abuttment therewith. Casing 61 is then slid over the collet assembly, the annulus as well as a portion of shaft 41. Lever or wrench 71 is then applied to the free end of shaft 41 and rotated until the lever engages casing base 63. Then the lever is tightened. Upon tightening, casing shoulder 62 will bear against the ignition key housing or other item or surface to which it is attached, and collet assembly 12 will then pull ignition key assembly or the lock cylinder from its housing. In conventional ignition key locks and the like, the lock is merely retained by a spring or other low shear device, the locking force of which, must be overcome. Once the restraining device has been overcome, the cylinder is removed and the new cylinder may be inserted.

Utilization of the removal apparatus set forth in FIGS. 1 through 5 in a vehicle having an ignition key cylinder located in the steering column eliminates the requirement of tearing apart the entire steering column in order to remove the ignition key assembly. Moreover, the device herein described can be readily and inexpensively manufactured.

It can thus be seen that the disclosed invention carries out the objects of the invention set forth above. As will be apparent to those skilled in the art, many modifications can be made without departing from the spirit of the invention herein disclosed and described, the scope of the invention being limited solely by the scope of the attached claims.

I claim:

1. An apparatus for removing a lock cylinder, comprising;

a collet assembly, said collet assembly having a conical base portion having resilient collet fingers, said collet fingers having an inwardly projecting lip, a shaft, said shaft connected to said collet base portion and having an external thread portion, an annulus having an internal thread engaging said external thread portion and having a shoulder, said annulus engaging said collet base portion to thereby bias said collet fingers inwardly, a casing, said casing extending at least partially about said collet assembly, a lever, said lever engaging said shaft, said lever bearing against said casing so that tightening of said lever causes said collet assembly to be drawn into said casing.

2. An apparatus for removing a lock cylinder according to claim 1, wherein said casing encompasses at least a part of said collet assembly, said shaft and said annulus.

3. An apparatus for removing a lock cylinder according to claim 1, wherein said collet diameter is larger than said annulus diameter.

4. An apparatus for removing a lock cylinder according to claim 1, wherein the lock cylinder is an ignition key cylinder.

* * * * *